United States Patent [19]

Grether

[11] Patent Number: 5,415,736
[45] Date of Patent: May 16, 1995

[54] NATURAL FIBER CONTAINING SHEET MATERIAL

[76] Inventor: Till Grether, Thurbruggstrasse 1, CH-9220 Bischofszell, Switzerland

[21] Appl. No.: 13,776

[22] Filed: Feb. 5, 1993

[30] Foreign Application Priority Data

Feb. 7, 1992 [CH] Switzerland ............... 00367/92

[51] Int. Cl.$^6$ ............................................. D21H 11/12
[52] U.S. Cl. ................................. 162/111; 162/112; 162/135; 162/141; 162/142; 162/147; 162/148; 162/158; 162/175; 162/168.1; 162/168.3; 162/178; 47/56; 47/9
[58] Field of Search .................. 162/98, 99, 141, 142, 162/147, 148, 150, 158, 175, 178, 111, 112, 92, 135, 168, 168.3; 47/9 S, 25 R, 56

[56] References Cited

U.S. PATENT DOCUMENTS

| | | | |
|---|---|---|---|
| 2,685,150 | 8/1954 | Linehan | 47/9 S |
| 3,158,530 | 11/1964 | Anastasio | 162/171 |
| 3,825,471 | 7/1974 | Fraiman | 162/142 |
| 4,272,919 | 6/1981 | Schmidt | 47/9 S |
| 5,191,734 | 3/1993 | Weber et al. | 47/56 |

FOREIGN PATENT DOCUMENTS

| | | | |
|---|---|---|---|
| 495644 | 2/1977 | Australia | 162/98 |
| 892006 | 8/1982 | Belgium . | |
| 0185927 | 7/1986 | European Pat. Off. . | |
| 50-17371 | 6/1975 | Japan | 47/9 S |
| 51-100447 | 9/1976 | Japan | 47/9 S |
| 13881 | 12/1908 | United Kingdom | 162/92 |
| 898579 | 6/1962 | United Kingdom | 162/148 |
| 2129844 | 5/1984 | United Kingdom | 162/92 |
| 2170795 | 8/1986 | United Kingdom . | |
| 2245555 | 1/1992 | United Kingdom | 47/9 S |

OTHER PUBLICATIONS

Freeman, "Successful Testing of a Wood Substitute for Making News Print May Lead to Mill," *Wall Street Journal*, Nov. 4, 1987, p. 40.
Patent Abstracts of Japan; vol. 12, No. 478; (M-775) Dec. 14, 1988 & JP, A, 62 199 605 Database WPIL Section PQ, Week 9006, Derwent Publications Ltd., Class P-31; AN 90-040626 & JP A.1 317 338.

*Primary Examiner*—Peter Chin
*Attorney, Agent, or Firm*—Ostrolenk, Faber, Gerb & Soffen

[57] ABSTRACT

A sheet material, typically paper or cardboard, contains a natural, chemically untreated fibrous material and a secondary long-staple fiber material in a weight ratio comprised between (50–90):(10–50). It further contains fiber fines, at least one retention agent for these fines and at least one sheet strength improving agent. The sheet may be manufactured on paper making machines after preparing a mash from the components listed above and refining. The sheet material is intended to replace paper or cardboard normally made from chemically treated, expensive raw materials.

17 Claims, No Drawings

NATURAL FIBER CONTAINING SHEET MATERIAL

This invention belongs to the field of paper or cardboard like sheet materials. In particular, the present invention is related to a sheet material which contains a major proportion of natural fibers, namely those stemming, for example, from peat, plants of the hemp family, flax, linen, husks of rice and other cereals and grasses, bark compost, cocos fibers, saw dust, wood shavings, and so on. The sheet material of the invention can be used in many fields such as agriculture, fruit farming, packaging industry, construction industry, etc.

In the following description, reference is made to the major intended use of the new sheet material, namely in the field of agriculture. This is done for sake of simplicity, and the following description is not to be construed as limiting the invention to any particular use. The expression "natural fibers" is to be understood not only in contrast to synthetic ones but also designates such fibers which did not undergo a chemical treatment.

Serious problems have arisen in agriculture due to the more and more intensive utilisation of the soil, in particular regarding erosion. Wind and water cannot seriously damage the soil as long as it is covered by vegetation or otherwise protected. When such a covering blanket of vegetation is absent, the beating rain can cause a water-soil mixture to move around. Fine earth particles penetrate into the soil together with percolating water and occlude the pores of the earth; a thin but nearly impervious skin-like shell is formed on the land surface. The Falling precipitation flows on this surface shell and erodes more soil. The wind carries away preferentially dry, fine sandy soil, and particules carried by the wind further liberate other particles, cumulatively multiplying the erosion. If the fertile upper soil layer of humus and mineral substances is partially eroded, the depth of the plant roots is reduced and the plants do not grow well. The crops decrease with every centimeter of reduced top soil, e.g. wheat by about 2.5%. Furthermore, nutrient substances are lost by erosion. It has been estimated that about half of the amount of fertilizer spread on the fields by U.S. farmers is to be considered necessary only for replacing the soil losses caused by erosion.

It is well known that the erosion impairs especially disadvantageously the watershed character of the ground; the water absorption capacity of the ground can decrease by 90%. Severe precipitations lead to inundations, and the loss of the natural water storage capacity of the soil leads to a more rapid drying-out of the plants.

Herbicides will also enhance erosion since they destroy the natural soil covering created by the weeds since their destruction leaves behind the naked land which is then exposed to erosional forces.

It follows from these facts that it is necessary to protect the topsoil by a continuous cover. If there is no natural covering of the ground by a vegetative blanket such as grass in orchards, the gardener proceeds with a so-called mulching where the naked soil is covered by plant wastes such as mown grass. This method can of course not be applied in large surface agriculture.

In the last years, it has become more and more usual to apply special soil covers at least during the culture period. These covers are generally webs of plastic sheets unrolled and spread on the soil previously cultivated and optionally manured. This is preferentially done by using a planting or sowing machine bearing a roll of a plastic material web. When the planting machine travels over the field, the web is unwound from the supply roll and spread on the ground. The planting machine is equipped to punch holes out of the web or to cut slits into the web, and the plant sprouts or seeds are put into the soil through these holes or slits. The plants traverse the holes or slits when growing, and the soil remains covered by the plastic web until the harvest time.

Whereas such plastic sheets solve the problem of erosion, a new difficulty is created in that there arises the problem of disposal of the plastic webs after harvest. Furthermore, plastic sheets are comparatively uneconomical and unecological, and these facts hinder them from being used more extensively.

It has already been proposed to use paper sheets or webs instead of those made of plastic. Other difficulties are encoutered when using paper sheets, especially the following: Normal, sized paper will shrink and roll up upon getting wet. The sizing substances will be leached and decomposed by the water in the laid-out web, and the paper web will be torn and destroyed.

The use of waste paper, i.e. newspaper waste, is forbidden for the production of foods and plants since it contains heavy metals and toxic substances which must not be reintroduced into the food chain.

There is further generally a need for paper and cardboard which will last unaltered for a certain, predetermined time period and which readily and rapidly disintegrates and decomposes after that time period, leaving behind exclusively compostable substances.

The present invention aims at eliminating the problems discussed above and at providing a new and useful sheet (or web) material based on natural, compostable materials which does not have the drawbacks mentioned above, which can be manufactured in a simple, unexpensive manner, and which physically behaves just as the known paper or cardboard.

The present invention complies with the objects cited above and provides a sheet material which contains natural fibers. A particularly suited method for the manufacturing of the new sheet material is described, as is particular and special embodiments of both the sheet material and the manufacturing process.

In the present specification and claims, the expression "sheet material" is meant a two-dimensional material having the thickness of known paper and cardboard. This expression covers sheets of any length and width and webs of any length and width as well.

It has already become known from the British patent No. GB-A-2,170,795 to manufacture a composite mulch in the form of granular bodies, of a pulp to be sprayed on the soil, or of pellets. This composite mulch contains a rather high proportion of fertilizer, preferably about 30% by weight. According to a further embodiment, the mulch may be prepared in sheet form on a paper making machine, spread on the surface to be mulched, and then dampened with water to conform to the contours of the underlying surface. It becomes evident from this description that this known mulch has only a faint relationship to the paper or cardboard like materials of the present invention.

The Derwent publication No. AN 90-040626 mentions the manufacture of a mulch sheet from common wood pulp, used papers and bark which does however not disclose the special additives used in the sheet material of this invention.

The sheet material of the invention contains, in addition to the cellulosic materials mentioned in the preamble of the first independent claim, some special additives which will be discussed later.

The chemically untreated, natural fiber material which makes up a substantial proportion of the new sheet material, as it will be specified later, can belong to a wide variety of species. Non-limiting examples of such materials are namely those stemming, for example, from peat, plants of the hemp family such as kenaf, flax, linen, husks of rice and other cereals and grasses such as esparto, bark compost, coco fibers, saw dust, wood shavings, and so on. These raw materials are not chemically treated before being incorporated into the sheet material of the invention but will generally be subjected to physical treatments in order to separate components which are not of fibrous nature or will otherwise impair the desired properties of the end product.

The length of the individual fibers of this first component of the new sheet material of the invention is not at all critical. However, too short fibers should be avoided since such fibers would constitute fines which would increase the original fines proportion for the retention of which in the sheet material special additives are necessary, as explained below. On the other hand, too long fibers should also be avoided since they undesirably increase the stiffness of the sheet and are too slowly biologically degraded. It has been found appropriate to select a natural fiber material where the length of the fibers is comprised between about 2 and 13 mm.

The new sheet material of the invention contains a retention agent for fiber fines. During the physical digestion or disintegration of the raw fiber materials, a certain proportion of fiber fines is produced. These fines are generally very short fibers and can be used as a kind of filler in the sheet material of the invention. The addition of these fines is therefore preferred, and the yield of the physical pre-treatment of the fibrous raw material is thus improved. The retention agents used in the invention may be those already known for this purpose in, e.g., the paper industry since industrial, normal papers typically contains a rather great proportion of particulate fillers and extenders. Examples of such retention agents which may also be used in the sheet material of the invention are polyethylene imines, polyacryl amides, cationic starch, etc. It should be emphasized, since retention agents are used in the paper industry for the retention of only particulate fines, that the addition of retention agents in the sheet material of the invention would be considered as useless at a first glance since the sheet material of the invention does not contain particulate fillers. However, it has been surprising to find that these retention agents are useful for the solid and durable incorporation of tiny crumbs being for example present in peat mull, into the sheet material of the invention. These crumbs are constituted by fine fibers generally present in the form of balls or hanks. Particularly, peat contains a rather great proportion of such crumbs.

It is preferred to use in the sheet material of this invention a fines fraction where the size of the particles is within the limits of about 0.5 to 1.2 mm.

The second major component of the sheet material of the invention, namely the cellulosic long-staple fiber material, may be selected from a multitude of sources, with the exception of mixed waste paper. Such sources are for example sulfate pulp or kraft pulp, then and preferably industrial wastes from the paper making industry such as cut-off border portions, punching chips, refuse and broke. A long-staple fraction of kenaf or esparto can also be used whereas the short-staple fiber fractions of these plants and the fines can be used as the primary fiber material. The length of the fibers of this second component of the sheet material of the invention is in the range of from about 2 to 13 mm, a fraction having an average fiber length of about 7 mm being preferred.

Furthermore, the sheet material of the invention contains at least one composition for improving the tear and rupture strength of the sheet. In the paper industry, paper strength proprieties are currently measured. The following properties are important:
breaking length,
bursting pressure,
folding strength,
tear (propagation) strength according to Brecht-Imset.

Furthermore, the freeness value is measured which has been obtained after a certain, standardized milling time. The above mentioned properties should be correlated to the freeness value since a pulp which has a high freeness value does not display high strength values. However, the invention aims at manufacturing a paperlike sheet having sufficient strength for the uses for which it is designed.

Paper strengthening compositions which are known per se are casein, starch, cationically modified starch and synthetic materials such as synthetic resins or rosins, generally applied in the form of water suspensions. The paper industry merely uses synthetic materials for paper strengthening; the present invention avoids synthetic strengthening agents in order to guarantee a total biodecomposition of the sheet material.

It has surprisingly been found that, according to the invention, a special additive may be used which acts as a fines retention agent and as a strengthening agent as well, namely the known cationic starches and, as a preferred additive, certain special, cationically modified galactomannan derivatives, such as certain guar gum brands for example supplied by Meyhall Company at Kreuzlingen, Switzerland. These additives have a specially good affinity to the fibrous components of the sheet material of the invention, and they are generally used in proportion ranges of from 0.1 to 1.25% by weight, typically 0.15 to 0.25% by weight of the total sheet.

It should be noted that, throughout this document, all percentages are by weight and refer to the total weight of the sheet material, if not otherwise stated.

A further, optional additive of the sheet material of the invention are starch particles or granules. This additive serves to control the speed of decomposition of the sheet material.

If it is desired for the sheet material of the invention to have a high water retention capacity, it is possible to add a special water retention agent. Examples for this special, optional additive are salts of starch modified polyacrylic acids. These salts have the ability to absorb 600 to 800 times their own weight of water in forming a hydrogel. During hydrogel forming, there is no swelling, i.e. volume extension, since the volume of the hydrogel is equal or even lower than the sum of the volumes of water and of the dry retention agent. Such water retention agents are supplied by Miller Chemical & Fertilizer Corp., Hanover, U.S.A. under the trade name of AquaGel.

One of the preferred natural fiber raw material is peat which is a product of the uncomplete decomposition of plant substance under exclusion of air oxygen. The structure of the plant parts remains essentially unchanged. Paper like sheets based on peat have already been known as mentioned before; however, prior approaches did not yield sheets of sufficient strength. Another natural fiber raw material which may be used with advantage since it is growing very rapidly and needs nearly no fertilizer nor weed herbizide, is kenaf, a plant belonging to the hemp family.

In the following description, reference is made to peat mull as the source of the natural fiber component of the sheet material of the invention, and an Example is given to still better explain the invention. However, it is to be understood that the invention is by no means to be construed as being limited by the mention of peat nor by the Examples. To the contrary, all sources of plant materials may be used which can be processed to supply a fibrous material.

For the use in agriculture, it is generally not necessary to bleach the sheet material of the invention which is typically of brown colour when peat has been used as a fiber raw material. For other uses where a bright colour is desired, fiber raw materials may be used which yield white or at least bright colour fiber materials, or a mild bleach with, e.g., aqueous hydrogen peroxide may be used. It has been observed that a soil cover made from peat containing sheet material which has a fairly dark brown colour, is bleached out in practice by the combined action of water and light. This bleaching effect is not desired since a dark coloured soil cover absorbs heat radiation and keeps the underlying soil warm, normally too warm. To compensate this bleaching out, a light fast, non-toxic organic dyestuff may be added to the sheet material of the invention, for example soluble Vandyke brown, a dyestuff well known in the paper industry.

The sheet material of the invention is composed of about 50% to about 90% of the above described, chemically untreated fiber material and about 10% to about 50% of a cellulosic long-staple secondary fiber raw material. The sum makes up 100%, and the additive or additives mentioned above are added thereto. It will become evident to the man skilled in the art that not only one material mentioned above can be used but also mixtures of two and more materials can be used.

Thus, the sheet material of the invention allows one to save expensive cellulosic fibers which must be produced mainly from wood by complex chemical treatments. It is known that these treatments are expensive and cause great problems regarding environment protection.

The use of kenaf has special advantages which will shortly be discussed in the following description. First of all, it should be noted that the strength of the kenaf fibres is high so that these fibers, especially the long-staple ones, serve as armour or reinforcing fibers which advantageously replace expensive wood cellulose fibers which had to be chemically treated whereas kenaf remains untreated. Kenaf plants can be cultivated on fallow grounds which are more and more left open nowadays due to the over-production in agriculture. Kenaf only needs very few fertilizers, and most portions of the plant remain on the field after harvesting where only the stems and stalks are used. After harvesting and defibration, the raw fiber material is separated into three fractions, namely long-staple fibers, short-staple fibers and fines. All three fractions may be used for the manufacture of a sheet material according to the invention (but also in combination with materials described above). The culture, harvesting and processing of kenaf into the three fractions is described and claimed in a copending Swiss patent application in the name of the present applicant.

Thus, it is possible to produce a paper or cardboard exclusively made up of kenaf components. Such a paper or cardboard has a great number of uses and applications. It may be used for special bags and sacks, cardboard materials in the construction industry, fully biologically degradable moulded parts such as party plates and dishes, toys, and so on.

Thus, the use of kenaf and other, analoguous plants of the hemp family leads to a new product line comprising a multitude of applications and uses in numerous fields and domains.

The sheet material of the invention is manufactured according to the present invention by a process which consists of the following steps: an aqueous mash is prepared from the at least one naturally, chemically untreated fiber material and at least one long-staple secondary fiber raw material; at least one fines retention agent and at least one strength improving agent are added to this mash, the combined mash is refined, and the refined mash is processed on a paper making machine in a manner known per se to a paper-like web which is then wound up on supply rolls. The web may be creped prior to winding up in order to give a special soil covering material web. It is also possible to give the sheet material a wet strength finish by means of addition of appropriate additives to the mash or by a final treatment of the web known per se.

The following Examples will give a still more detailed description of embodiments of the invention.

EXAMPLE 1

Peat Based Mulch Sheet 4,000 parts of sulfate cellulose from wood, 6,000 parts of commercial peat and 15 parts of "Meyproid 9806", a cationically modified galactomannan supplied by Mayhall Chemicals Corp., are pulped with water in a pulper for 20 minutes until the mash is free from flakes. The parts given above are calculated as dry solids. The mash is treated as usual, refined, deflaked and passed through a machine chest into the paper machine headbox.

The paper sheet is made according to the known paper making techniques. The paper web is creped before or after winding up. A dark brown product is obtained having crepe rate of about 15% and a weight of about 130 g/m$^2$. The paper may be cut to the desired user width later on.

EXAMPLE 2

Kenaf Based Mulch Sheet

The procedure of Example 1 is repeated with the exception that the peat is replaced by a long-staple fiber fraction (12 to 15 mm) and a fines fraction (0.5 to 2 mm) of processed Kenaf plant portions.

Further, auxiliary agents which are described below may be added to the paper sheet in the size press or to the mash in the machine chest.

EXAMPLE 3

Kenaf Based Filter Paper

The procedure of Example 1 is repeated with the exception that both the sulfate, cellulose and the peat are replaced by a mixture of short-staple kenaf fibers (length about 5 to 8 mm) and long-staple ones (length about 12 to 15 mm), and that a board paper machine is used. Circular filter paper sheets are obtained which may perfectly replace cellulose filter papers.

EXAMPLE 4

Kenaf Based Batch Paper

Batch papers are papers which contain kenaf fibers in an amount effective to replace expensive cellulose and to improve the strength values of the paper or to maintain their previous level even if relatively great amounts of cellulose are replaced.

The short-staple fiber fraction of Kenaf is milled in the paper mill in a separate string or batchwise, using wet milling in a pulper. The fiber mash may, if necessary, be hot washed by the introduction of steam and solvents. The mash thus obtained is passed through a deflaker into a refiner where the degree of beating is adapted to that of the product to be manufactured. The mash is then transferred to a storage vat and can be pumped continuously or batchwise into the machine chest where it is mixed with the conventional cellulose mash. Alternatively, the kenaf mash can be made into a vleece mat which can be transported and used like cellulose mats.

The fibrous webs thus obtained, typically wound up on rolls, can be shipped to the user who may then use them like cellulose. The advantage of this product is to make a fiber sheet material available to customers who are thus enabled to use kenaf or kenaf containing products without having the necessary know how.

Special papers for documents and art print can be obtained from a mixture of long or short-staple kenaf fibers with pH neutral fibers; of course, all fiber mixtures are prepared before papermaking on the machine By using parallel deflaking and refining as mentioned in Example 4, a perfect homogenization is obtained yielding a low specific volume which brings about special and surprising properties of the paper regarding coating, pigmenting and calendering ability and especially ageing stability.

Papers which has been reinforced by kenaf fibers may also be used in the food packaging industry. An interesting application is the manufacture of a composite paper consisting at least of a kenaf paper layer destined for coming into contact with the food product, and one or more underlying reinforcing layers consisting of recycled waste paper optionally reinforced with kenaf fibers.

Another preferred use of kenaf fibers in the context of the present invention is the manufacture of fibrous panels and boards. Kenaf fibers, namely a mixture of short and long-staple fibers and fines and optionally further fibers is processed into a mash which is further processed on a cardboard making machine to strong cardboard panels which are used in the construction industry as construction panels, insulating boards and softboards.

The sheet material of the invention can be manufactured in all desired web widths and specific weights. Unit surface weights comprised between about 70 and about 150 g/m² are currently used. When used as a mulch material, these widths will be determined by the requirements of the lay-out machines. Presently, widths of 135 and 185 cm are preferred for the mechanical spreading with tractors having a track gauge of 150 and 200 cm, respectively. The mulch material is supplied on rolls and may be creped or otherwise rendered elastic; this material better adapts to the irregularities of the ground.

The laying out of the sheet material of the invention, when used as a mulch material, is done in the conventional manner which has already been described above, i.e. in the same manner as the already known plastic webs. The web is continuously unrolled and laid down on the cultivated soil which may already have been fertilized, and the border portions are covered with earth to a width of about 10 to 20 cm. The plants are inserted, as before, directly through openings or slots in the web by hand or mechanically. After the harvesting of the plants, the cover is ploughed or hoed into the ground. This way of getting rid of the mulch material which greatly simplifies cultivation has been made possible by the invention since the sheet material is very quickly decomposed in the earth and can further be controlled by the addition of starch granules, as it has been already mentioned above.

The sheet material of the invention for mulching may further be modified. It is possible to incorporate seeds, fertilizers, plant protective agents, herbicides, insecticides and so on. This further improvement may be accomplished by the formation of an additional upper or intermediate layer having a high degradation rate and a specific weight of about 12 to 15 g/m². This layer will contain the above cited additives in the desired distribution and comprise typically short-staple fibers. These composite sheet material may easily be manufactured on multiple wire paper machines. Other modification of the sheet material of the invention are also possible such as the addition of wet-strength chemicals to the wash. All these modifications and improvements are within the skill of the man familiar with the art and are comprised within the scope of the invention as defined in the following claims.

The invention therefore provides new mulch materials whose properties can be adapted to the particular requirements of use by programming especially the disintegration time period. This requirement may be fulfilled by controlling the concentration of starch particles in the sheet material. Furthermore, seeds and/or fertilizers, herbicides and other soil or crop improving agents may be added to the sheet material of the invention. On decomposition or disintegration of the sheet material, these components are liberated and begin to perform their purpose. The particular mulch sheet may also be adapted to the particular conditions of use by controlling its tear-off strength.

Furthermore, the invention opens a new route to replace wood cellulose which is expensive and whose manufacture from wood and whose chemical treatments require a great amount of energy and toxic chemicals.

I claim:

1. A wet laid sheet material containing natural fibers, comprising (A) a natural, chemically untreated kenaf fiber material having a length in the range of about 2 to 13 mm and (B) a natural cellulosic long-staple fiber material with the exception of mixed paper wastes and having a length different from the length of fiber (A) in the range of about 2 to 15 mm, in which the weight ratio of components (A) and (B) is comprised in the range of from about 50 to 90 parts of (A) to about 10 to 50 parts of (B) based on a total weight of components (A) and (B) of 100 parts, and that the sheet material further contains fiber fines, at least one retention agent for the fines and at least one agent for improving the strength of the sheet material.

2. Sheet material according to claim 1, wherein said sheet material contains a combined agent for retention of fines and for sheet strength improvement.

3. Sheet material according to claim 2, wherein the combined agent is a cationically modified starch.

4. Sheet material according to claim 2, wherein the combined agent is a cationically modified galactomannan.

5. Sheet material according to claim 1, wherein said sheet material further contains a water retention agent.

6. Sheet material according to claim 5, wherein the water retention agent is a salt of a starch modified polyacrylic acid.

7. Sheet material according to claim 1, wherein long-staple fiber material (B) is sulfate pulp or kraft pulp.

8. Sheet material according to claim 1, wherein said sheet material further contains starch granules for improving the biological degradation.

9. Sheet material according to claim 1, wherein said sheet material further contains at least one non-toxic organic light fast dyestuff.

10. Sheet material according to claim 1 wherein said sheet material has a specific weight in the range of from about 70 to about 150 g/m².

11. Sheet material according to claim 1, wherein the natural, chemically untreated fiber material is derived from kenaf plant parts whose fibrous material has been separated into at least three fractions, the first fraction (I) comprising long-staple fibers having a length in the range of from about 10 to 15 mm, the second fraction (II) comprising short-staple fibers having a length of from about 4 to 10 mm, and a fines fraction (III) having a size of from 0.5 to 3 mm, the sheet material containing at least one of these three fractions.

12. Sheet material according to claim 11, wherein the long-staple fiber material (B) is at least in part said fraction (I) or a mixture of fractions (I) and (II).

13. Sheet material according to claim 1 wherein said sheet material is a creped sheet.

14. Sheet material according to claim 1 for use as a mulch sheet, wherein it further comprises a top or intermediate layer containing at least one of seeds, fertilizers and plant protecting agents.

15. A process for the manufacture of the sheet material, comprising (A) a natural, chemically untreated kenaf fiber material having a length in the range of about 2 to 13 mm, (B) a natural cellulosic long staple fiber material with the exception of mixed paper wastes and having a length different from fiber (A) in the range of about 2 to 15 mm, and fiber fines, components (A) and (B) are present in a weight ratio in the range of about 50 to 90 parts of (A) to about 10 to 50 parts of (B) based on a total weight of components (A) and (B) of 100 parts, said process comprising preparing an aqueous mash of said fiber materials (A), (B) and fiber fines, adding at least one retention agent for fines and at least one web strength improving agent to said aqueous mash to form a combined mash, the combined mash is refined, forming a sheet from said combined mash on a paper making machine, and winding said sheet into rolls.

16. Process according to claim 15, wherein the web is creped before winding up on said rolls.

17. Process according to claim 15, wherein a cationically modified galactomannan is added to the mash in an amount of from about 0.1 to 1.25% by weight, referred to the total dry weight of solid paper substances, as a combined agent for fines retention and web strength improving.

* * * * *